United States Patent
Sibert et al.

(10) Patent No.: US 9,563,778 B2
(45) Date of Patent: Feb. 7, 2017

(54) METHOD FOR MANAGING PUBLIC AND PRIVATE DATA INPUT AT A DEVICE

(71) Applicant: ST-ERICSSON SA, Plan-les-Quates (CH)

(72) Inventors: Herve Sibert, Le Mans (FR); Nicolas Anquet, Grenoble (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/261,867

(22) PCT Filed: Oct. 26, 2012

(86) PCT No.: PCT/EP2012/071227
§ 371 (c)(1),
(2) Date: May 14, 2014

(87) PCT Pub. No.: WO2013/072177
PCT Pub. Date: May 23, 2013

(65) Prior Publication Data
US 2014/0344941 A1  Nov. 20, 2014

Related U.S. Application Data

(60) Provisional application No. 61/568,187, filed on Dec. 8, 2011.

(30) Foreign Application Priority Data

Nov. 14, 2011  (EP) .................................. 11290523

(51) Int. Cl.
*G06F 21/60* (2013.01)
*G06F 21/74* (2013.01)
*G06F 21/83* (2013.01)

(52) U.S. Cl.
CPC ............... *G06F 21/60* (2013.01); *G06F 21/74* (2013.01); *G06F 21/83* (2013.01); *G06F 2221/2123* (2013.01)

(58) Field of Classification Search
CPC ............... G06F 21/10; G11B 20/00086; G11B 20/0021; H04L 63/0428; H04N 21/4405
USPC ......................................................... 726/26
See application file for complete search history.

(56) References Cited

U.S. PATENT DOCUMENTS

| | | | | |
|---|---|---|---|---|
| 5,664,162 A * | 9/1997 | Dye | ........................ | G06F 9/383 345/503 |
| 5,903,916 A * | 5/1999 | Pawlowski | ......... | G06F 13/1626 365/189.04 |
| 6,567,409 B1 * | 5/2003 | Tozaki | ................. | H04N 21/238 370/395.64 |

(Continued)

FOREIGN PATENT DOCUMENTS

| | | |
|---|---|---|
| EP | 1526426 A2 | 4/2005 |
| WO | 2008013738 A2 | 1/2008 |

*Primary Examiner* — Farid Homayounmehr
*Assistant Examiner* — Sanchit Sarker
(74) *Attorney, Agent, or Firm* — Howison & Arnott, LLP (57) ABSTRACT

A method is provided for managing public and private data input by a device such as a mobile handset, a personal digital assistant, a personal computer and an electronic tablet. Method provides for separating public and private data such that public data can be operated on by open operating system and private data is either encrypted while in the open operating environment but can be operated on and used when received by the secure operating environment.

10 Claims, 8 Drawing Sheets

(56) References Cited

U.S. PATENT DOCUMENTS

| | | | |
|---|---|---|---|
| 7,889,862 B2* | 2/2011 | Dellow | G06F 12/1408 380/277 |
| 2002/0111920 A1* | 8/2002 | Tresser | G06Q 20/206 705/74 |
| 2005/0021919 A1* | 1/2005 | Kroening | G06F 11/1441 711/165 |
| 2008/0028441 A1* | 1/2008 | Novoa | G06F 21/83 726/4 |
| 2008/0187040 A1* | 8/2008 | Yu | H04N 21/235 375/240.01 |
| 2009/0100186 A1* | 4/2009 | Darshan | G11B 27/105 709/231 |
| 2009/0119604 A1* | 5/2009 | Simard | G06Q 10/10 715/757 |
| 2009/0144349 A1* | 6/2009 | Phillips | G06F 12/0261 |
| 2009/0282261 A1* | 11/2009 | Khan | G06F 21/72 713/189 |
| 2010/0011219 A1* | 1/2010 | Burton | G06F 21/31 713/182 |
| 2011/0078570 A1* | 3/2011 | Larsen | G06F 19/322 715/710 |
| 2011/0179136 A1* | 7/2011 | Twitchell, Jr. | H04L 45/586 709/217 |
| 2012/0092453 A1* | 4/2012 | Suh | H04N 13/0066 348/43 |
| 2012/0324538 A1* | 12/2012 | Malegaonkar | H04N 21/25808 726/4 |

* cited by examiner

METHOD FOR MANAGING PUBLIC AND PRIVATE DATA INPUT AT A DEVICE

CROSS-REFERENCE TO RELATED APPLICATIONS

This application is a U.S. National Phase application submitted under 35 U.S.C. §371 of Patent Cooperation Treaty application serial no. PCT/EP2012/071227, filed Oct. 26, 2012, and entitled A METHOD FOR MANAGING PUBLIC AND PRIVATE DATA INPUT AT A DEVICE, which application claims priority to European patent application serial no. 11290523.7, filed Nov. 14, 2011, and entitled A METHOD FOR MANAGING PUBLIC AND PRIVATE DATA INPUT AT A DEVICE and also to U.S. provisional application Ser. No. 61/568,187, filed Dec. 8, 2011.

Patent Cooperation Treaty application serial no. PCT/EP2012/071227, published as WO2013/072177, and European patent application serial no. EP 11290523.7, are incorporated herein by reference.

TECHNICAL FIELD

The invention relates to a method for managing public and private data input at a device. The invention also concerns a device adapted to carry out the method, a computer program comprising instructions for performing the method and a data storage medium having recorded thereupon such computer program.

BACKGROUND

Mobile handsets, as well as PCs or tablets, generally use the same input device for all purposes. Such input device may, for instance, be a keyboard, mouse, or touch sensitive screen. This involves that the same input device is shared by all the environments running on the device. In case when one of these environments processes sensitive data, it is desirable that what is displayed to and what is input from the user remains known only to the user and to the sensitive environment. Security in data processing and information systems, including communication systems, contributes to accountability, fairness, accuracy, confidentiality, operability, as well as a plethora of other desired criteria.

There are several techniques used to control the display. A display is like a memory buffer (frame buffer), whose content is exactly the screen display. It is feasible, using dedicated hardware, to control both the read and write access to the frame buffer. In general, it is easy to control the access to any output or passive peripheral using dedicated hardware. For instance, a control register may be used for defining which master has access to the frame buffer, this control register being in turn controlled by the most secure environment on the platform, which decides the access policy on the device. Another possibility, when using a virtualization solution, is to let the hypervisor decide which virtual machine can see the frame buffer—and map the frame buffer memory to this virtual machine only.

Sharing the control of input peripherals, such as a keypad or a touch screen, is much more complicated. Indeed, when user action is detected by the peripheral, the central processing unit (also named by the acronym CPU) is triggered using interrupts and signaling through General Purpose Inputs/Outputs (also named by the acronym GPIOs) that have been properly configured. In order to be able to share, with isolation, such input peripherals, between environments running simultaneously on this central processing unit, several techniques may be used.

It is known to use a virtualization solution to run virtual machines and to restrict the General Purpose Inputs/Outputs (GPIO) programming and interrupts from the input peripherals to a hypervisor. Each virtual machine corresponds to an environment. A hypervisor is also called virtual machine manager. The hypervisor is then in charge of deciding which virtual machine can get the input, and of dispatching this input to this virtual machine. The main drawback with this solution is that it requires a virtualization solution. In this case, the access control is static, as the hypervisor can be given this access and then apply its own policy for interaction with the virtual machines.

There is also a known a technique which comprises restricting the GPIO programming and interrupting from the input peripherals to the most secure environment that may need these inputs. The secure environment is then in charge of deciding which environments on the platform can get the input, and dispatching the input to this environment. Thus, every input would trigger first execution in the secure environment. As most of the input during runtime is dedicated to another environment (e.g. Linux—registered trademark—), the secure environment generally triggers execution in the open environment, providing the information to the open environment. Once the open environment has finished, it switches to the secure environment to clear the initial input trigger, and comes back again to normal execution in the open environment. Such operation is not the most efficient.

Another solution may be considered. Dedicated hardware can be added to control both the dispatching of the input peripheral information (interrupts, GPIOs) the access to the GPIO programming interface, using for instance a control register to define which master has access. The control register, in turn, is controlled by the most secure environment. There is no need for the different environments to be virtualized on top of a hypervisor. For instance, a secure environment and an open environment may run on the same CPU using hardware virtualization such as Trustzone (registered trademark). A drawback with this solution is that it is very complicated to protect the access to GPIOs dynamically. Hence, this solution is nearly unpractical to implement.

SUMMARY

The object of some embodiments of the invention is to alleviate, at least partly, the above mentioned drawbacks.

In a first embodiment, a method for managing public and private data input at a device having a data-input peripheral, an open environment, and a secure environment, a controller connected to the data-input peripheral. The method comprises the steps of: receiving, at the controller, data provided at the data-input peripheral; determining, at the controller, whether the received data comprises private data; and if the received data comprises private data, the controller providing the secure environment with a secured access to the private data, the controller causing the secure environment to access the private data by sending operative data to the secure environment via the open environment.

A second embodiment provides a device comprising a data-input peripheral; an open environment; a secure environment; and a controller connected to the data-input peripheral, wherein the controller is adapted to enable the method according to the first embodiment.

A third embodiment provides a computer program comprising instructions for performing the method in accordance with the first embodiment.

A fourth embodiment concerns a data storage medium having recorded thereupon the computer program according to the third embodiment.

Further features and advantages of the invention will appear from the following description of embodiments of the invention, given as non-limiting examples, with reference to the accompanying drawings listed hereunder.

The term private data and public data should be understood in a broad sense. Typically, private data is data that is at some point is concealed for the purpose of preventing an unauthorized person from accessing the data. However, the claims are not limited to this interpretation. The term private data could alternatively be thought of as a first category of data and the public data be thought of as a second category of data. The two categories are handled as described in the claims with reference to private data and public data, respectively.

DETAILED DESCRIPTION

A method for managing public and private data input at a device is proposed. As examples, such method will be illustrated for two cases of use: phone communication and browsing through an online bank web site, the online bank web site being provided by a remote server. In the remainder of the description, phone communication will be referred as "case 1" and the browsing through an online bank web site as "case 2".

Private data is particularly sensitive and should be transmitted in a secure way whereas public data does not need specific protection. In case 1, private data may be a pin (Personal Identity Number) code of a GSM mobile phone, and the public data may be the phone number used for the phone communication. For the sake of illustration, the pin code is "1000" and the phone number is "00 00 00". In case 2, when the user enters its bank code, e.g. "0123456789", this should be considered as private data whereas a click on a tab of the online bank web is usually considered as being public data. It can be noticed that in case 1, private data is internal to the device while private data in case 2 are sent to an external server through a communication network.

The device considered may be of different kinds. For instance, the device may be a mobile handset, a personal digital assistant, a personal computer or a tablet. Examples of such devices 10 are illustrated on the schemes of FIGS. 1, 2, 3 and 4.

Figure 1:
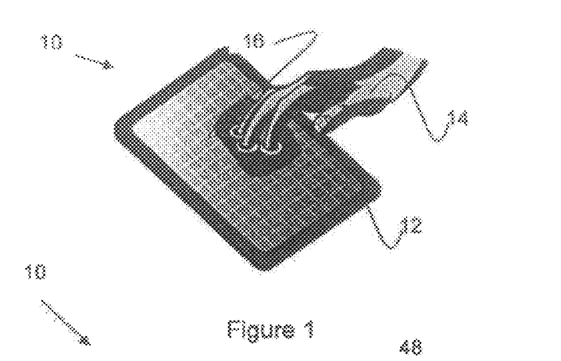
FIGS. 1, 2, 3 and 4 show different schematic view of the device.
Figure 2:
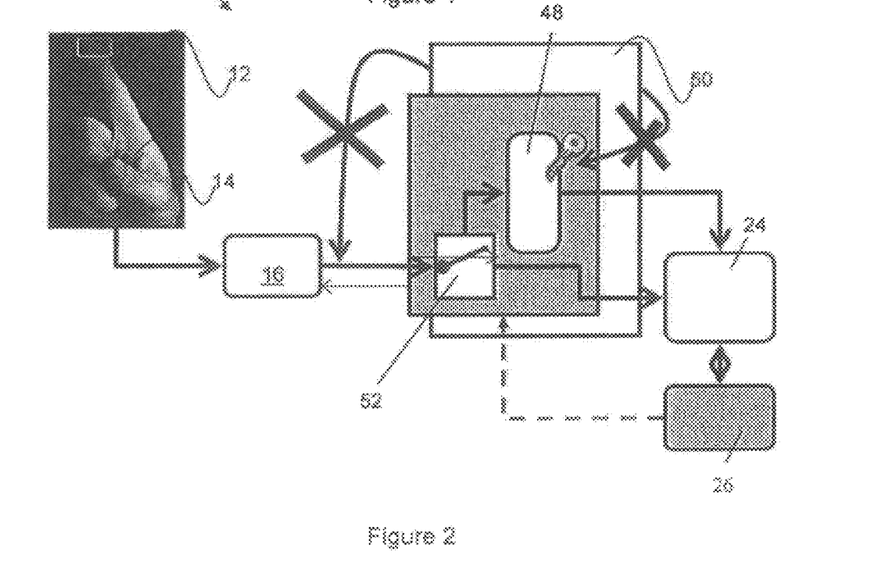
Figure 3:
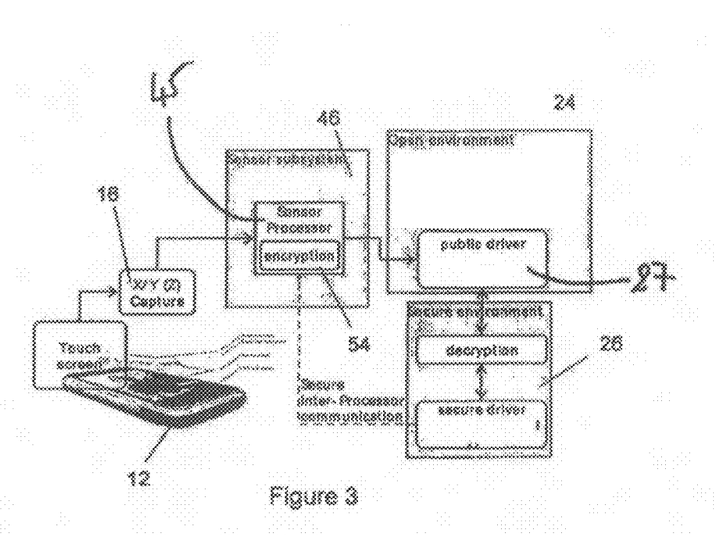

The device 10 may comprise a data-input peripheral 12. Referring to FIGS. 1, 2, and 3, such peripheral 12 enables the user symbolized by the hand 14 to enter data input in the device 10. As examples, the peripheral 12 may be a keypad, a keyboard, a mouse or a touch screen.

Figure 4:
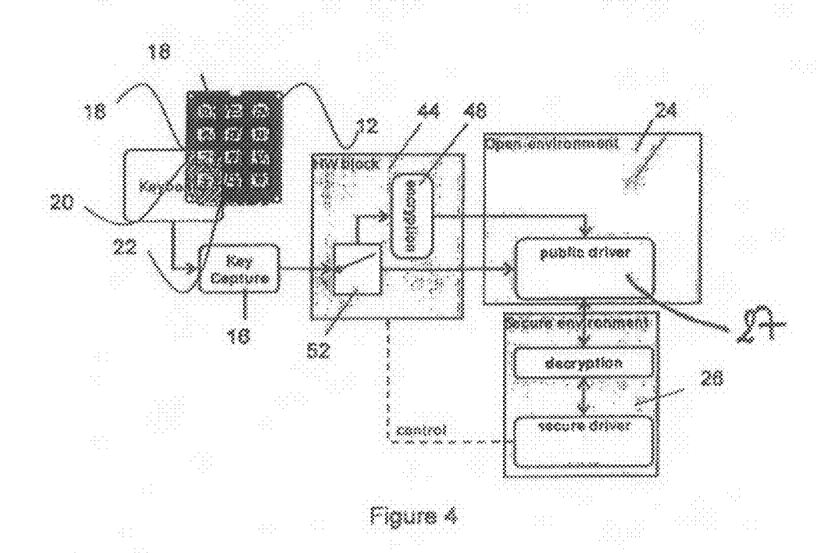

According to the examples of FIGS. 1, 2 and 3, the peripheral 12 is a touch sensitive screen and thus the user's interactions with the device are performed upon touching the peripheral 12. The fingers of the hand 14 are in contact with the touch sensitive screen, as illustrated by the circles 16 located on the surface of the screen. The corresponding sections of the peripheral are activate. In the example of FIG. 4, the data-input peripheral is a numeric keyboard with twelve keys, ten keys 18 representing a number from 0 to 9, a key 20 which represents the sign "*" and a key 22 which represents the sign "#".

As shown on FIGS. 2, 3 and 4, the device 10 comprises an open environment 24. An open environment 24 is usually a rich operating system (also named as "rich OS"). A rich OS is a high-level operating system environment with a rich capacity set and allowing the user to download and run applications. Android (registered trademark), Linux (registered trademark), Symbian OS (registered trademark) and Microsoft (registered trademark) Windows (registered trademark) Phone 7 are examples of such an open environment 24. The open environment 24 is dedicated to the public data.

In contrast, the device 10 also comprises a secure environment 26, which is dedicated to the private data. The secure environment 26 can neither be accessed by the user to download and run applications nor by the open environment 24. Thus, the secure environment 26 is secure from any exterior attacks. More generally, an open environment 24 should be construed as an execution environment with fewer requirements in terms of security compared to a secured environment 26.

For instance, such a combination of the secure environment 26 and the open environment 24 in a device 10 is suitable for case 1 and case 2. In case 1, the secure environment 26 checks if the PIN code entered is the right one, whereas the open environment 24 ensures that a communication is established based on the phone number entered by the user in the device 10.

Figure 5:
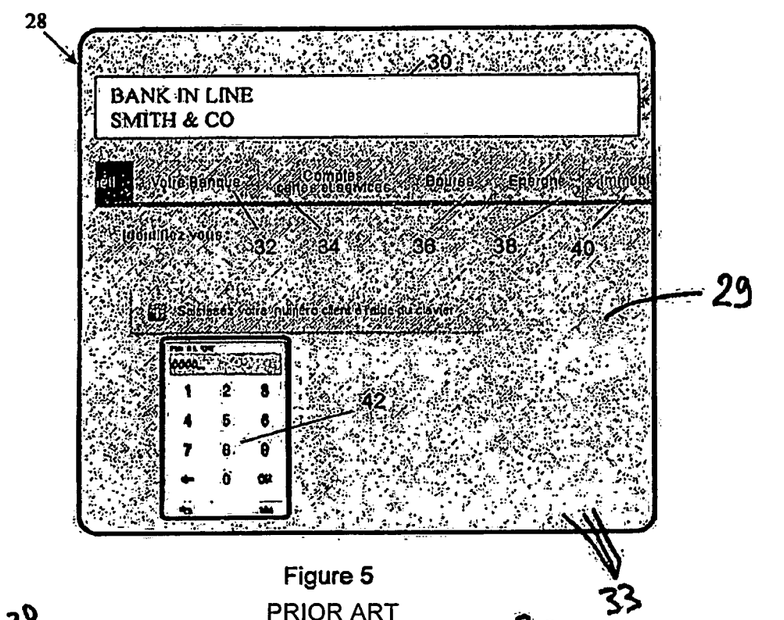
FIGS. 5 and 6 represent a bank user interface.

The case 2 can be illustrated by FIG. 5, which is a schematic view of a banking interface 28 accessible from the Internet. This banking interface comprises two areas 29 and 42 displayed simultaneously that are provided by the bank server. According to the example of FIG. 5, the first area 29 is a public area which is common to all the users of the banking interface 28. The first area 29 may comprise images such as here the name of the bank 30 and selection tabs respectively labelled "your bank" 32, "counts, cards and services" 34, "stock exchange" 36, "savings" 38 or "property" 40. Upon selection of one tab 32, 34, 36, 38 or 40, further information can be provided by the server which may comprise displaying new information. The first area 29 is controlled by an application running on the open environment 24, since the public data to be provided to the server is not sensitive.

The second area 42 may be a private area, which can be accessed by a specific user. The user's bank code is entered in this private area. The second area is controlled by an application running on the secure environment 26, as the user's bank code is a sensitive data.

In both cases, the combination of the secure environment 26 and the open environment 24 ensures that the private data is not accessible for any exterior attacks. As will be explained later in the description, FIG. 6 corresponds to FIG. 5, FIG. 6 being the bank interface 28 obtained according to the invention whereas FIG. 5 illustrates the bank interface 28 obtained according to the prior art.

The device 10 also comprises a controller 44 which is connected to the data-input peripheral 12. The controller 44 is adapted to carry out the method for managing public and private data that are input on the device 10.

Figure 7:
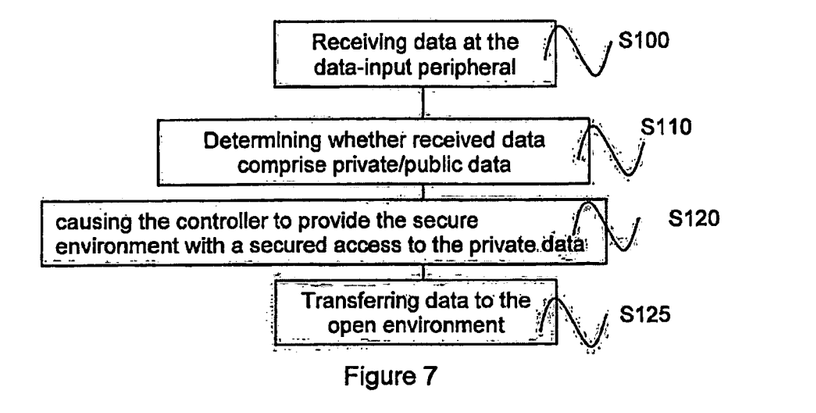
FIGS. 7 and 8 are two Flowcharts of two embodiments of the proposed method.

FIG. 7 is an exemplary flowchart of a method for managing public and private data which may be implemented in the controller 44. The method comprises a step S100 of receiving at the controller 44 data input at the data-input peripheral 12. The data may encompass both public and private data.

In case 1, the data entered is "1000" in the area for entering the PIN code and "00 00 00" in the area for entering the phone number. In case 2, the data consists in entering "01234" in the area wherein the user enters the bank code of the user and then clicking on a tab.

At step S110, it is determined whether received data comprises private data. Meanwhile, the method may also comprises a step of determining whether received data comprise public data. Carrying out the determining steps simultaneously ensures a quicker determination in so far as there are only two alternatives: a data is either public or private.

In case 1, the data "1000" is determined as private data while the data "00 00 00" is determined as public data. In case 2, the data "01234" is determined as private whereas click on a tab is determined as being public data.

Such determining steps S110 may be carried out based on instructions provided by the secure environment 26 to the controller 44. The instructions are able to make the distinction between the private data and the public data. The private data is intended to the secure environment 26 whereas the public data is intended to the open environment 24.

As examples, the instructions identifying public and private data may comprise indications on the location where private data is entered by the user. By reference to FIGS. 4 and 5, data entered in the private area 42 should be considered as private data whereas the data entered in the public area 29 should be considered as public data. These examples may be implemented for both cases 1 and 2.

According to the specific example of FIG. 4, the data-input peripheral 12 is a keyboard. It may be considered that the ten number keys 18 are a first set of keys and the two others keys 20 and 22 are a second set of keys. In this embodiment, the instructions identifying public data and private data may comprise instructions to consider data entered with the first set of keys as private data and data entered with the second set of keys as public data. The identification of public data and private data for the controller is thus made easier. Indeed, data containing numbers is private data whereas public data does not contain numbers. This can also be applied to case 2, wherein the private data is a code and the public data is only clicks on tabs.

The method according to the flowchart of FIG. 7 also comprises a conditional step S120 of causing the controller 44 to provide the secure environment 26 with a secure access to the private data, the controller 44 causing the secure environment 26 to access the private data by sending operative data to the secure environment 26 via the open environment 24. The step is carried out if received data comprises private data.

In case 1, this means that the secure environment 26 has access to data "1000" entered by the user and in case 2, the secure environment 26 has access to the data "01234". This access is made upon request of the controller 44.

The private data can thus not be accessed by the open environment 24 and the secure environment 26 accesses to the private data only upon request of the controller 44 via the open environment 24.

The method according to Flowchart of FIG. 7 further comprises another conditional step S125 of causing the controller 44 to transfer the public data to the open environment 24. The step is carried out if received data comprises public data.

In both cases 1 and 2, the step S125 is carried out because as explained before, the data entered contains public data. More specifically, in case 1, the phone number "00 00 00" is transferred to the open environment 24 and, in case 2, the information that the user has clicked on a tab is transferred to the open environment 24.

Thus, the method enables to send both operative and public data to the open environment 24 with a minimum risk from the security point of view, and notably limited risk of eavesdropping. As the public data is directly sent to the open environment 24 without passing through the secure environment 26, the interactions between the device 10 and the open environment 24 are made faster, which results in a minimization of the delay between the requirement of an activation of an application of the open environment 24 by the user on the device 10 and the activation of the required application on the device 10.

Further, the proposed method can be implemented in a relatively easy way. In particular, as can be inferred from the description of FIGS. 3 and 4, the architecture of the different elements of the device 10 does not need to be dynamically configurable, so as to belong to the secure environment 26 or not. This is also true for the GPIOs.

Figure 8:
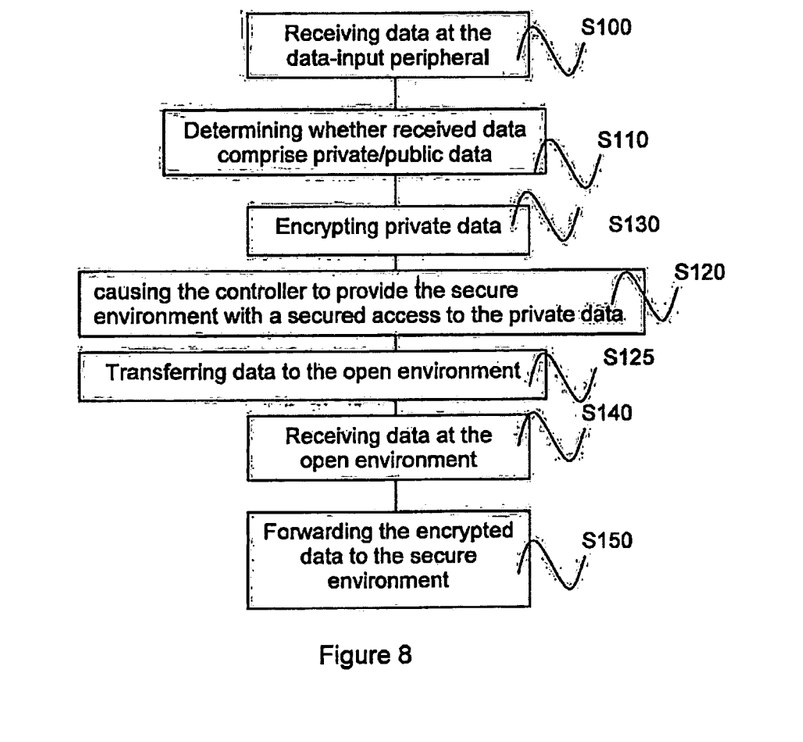

According to a specific embodiment, the method for managing public and private data input at a device may be the one of the flowchart of FIG. 8. In this case, the controller 44 has encryption capability. An encryption capability is the capability to encrypt data. An encryption, or the general field of cryptography, is used in electronic commerce, wireless communications, broadcasting and has an unlimited range of applications. In electronic commerce, encryption is used to prevent fraud in and verify financial transactions. In data processing systems, encryption is used to verify a participant's identity. Encryption is also used to prevent hacking, protect Web pages, and prevent access to confidential documents.

Such encryption may be carried out based on a key provided by an external server. The encryption capability may be provided to the controller by adding a component to the controller. This is the case of FIGS. 2 and 4 in which it is a hardware component 48 which provides to the controller 44 its encryption capabilities.

The encryption capability may also be provided to the controller 44 by reprogramming the software of the controller 44. The reprogramming is particularly advantageous as it enables classic controllers to be used in the method for managing data. FIG. 3 illustrates an example of such case.

According to the flowchart of FIG. 8, the method comprises the step S100 of receiving data and the step S110 of determining as described in reference to the method of flowchart of FIG. 7. The method further comprises a step S130 of encrypting at the controller 44 the private data. Once the step S130 has been carried out, the data intended for the secure environment 26 is encrypted whereas the data intended for the open environment 24 is unencrypted.

Such encryption of data should not be confused with the encryption process used in standard communication device for communicating via an external network. Indeed, classically, a secure server provides a key to the secure environment 26 wherein the private data is encrypted before being sent through the network. Such encryption process used in a standard communication device can be qualified as an external encryption whereas the encryption according to the embodiment of Flowchart of FIG. 8 can be construed as an internal encryption, since the key is only shared between internal components or software of the device 10.

To carry out such encryption, when instructions are provided at the step S110 to the controller 44, the instructions provided to the controller 44 may also encompass the encryption parameters to be used to encrypt the private data.

For instance, the key and initialisation vector for an AES authenticated encryption mode like CCM may be provided in the instructions. Advanced Encryption Standard or AES, also known as Rijndael is an algorithm with symmetrical encryption, chosen in October 2000 by the NIST to be the standard of encryption for the governmental organization of the United-States. By symmetrical, it is meant that the same key (also called the secret key) is used to encrypt and decrypt the data. In this case, the data encrypted is called cypherdata. CCM mode is the mode of operation for cryptographic block ciphers. It is an authenticated encryption algorithm designed to provide both authentication and confidentiality. When the key and initialisation vector for an AES authenticated encryption mode like CCM are provided in the instructions, the step 130 of encrypting may be carried out by the AES technique.

For the example of FIG. 3, the device 10 is provided with a sensor subsystem 46 comprising a sensor processor 45 and an encryption software 54. The encryption parameters used by the encryption software 54 of the sensor processor 44 to encrypt the first data are chosen by the secure environment 26 and sent in protected messages. For instance the encryption parameters may be stored in a memory shared by the secure environment and the sensor subsystem 46.

According to the embodiments of FIGS. 2 and 4, the instructions are provided to a component 44 and comprise indication to identify the data to be encrypted and the public data and the encryption parameters to be used to encrypt the private data.

As a basic example, it will be considered in the remainder of the description that encoding the data consists in adding a series of 1 to every digit of the data at the controller and subtracting a series of 1 from, every digit of the encrypted data to decrypt it. Thus, for case 1, the encrypted data is "2111" whereas, for case 2, the encrypted data is "12345".

According to the flowchart of FIG. 8, the method also comprises the step S120 of causing the controller 44 to provide the secure environment 26 with a secure access to the private data, the controller 44 causing the secure environment 26 to access the private data by sending operative data to the secure environment 26 via the open environment 24. In this specific embodiment, the operative data is the encrypted data. The step is carried out if received data comprises private data.

The method according to the flowchart of FIG. 8 also comprises the conditional step S125 of causing the controller 44 to transfer the public data to the open environment 24. The step is carried out if received data comprises public data.

For case 1, this implies that the data "2111 00 00 00" is transferred to the open environment. In case 2, the data transferred is "12345" followed by the information that a click on a tab has been entered by the user.

Thus, the method ensures that both public and operative data are transferred to the open environment 24 with a minimum risk from the security point of view, and notably limits the risk of eavesdropping. As the public data is directly sent to the open environment 24 without passing through the secure environment 26, the interactions between the device 10 and the open environment 24 are fastened, which results in a minimization of the delay between the requirement of an activation of an application of the open environment 24 by the user at his device 10 and the activation of the required application at his device 10.

In addition, only the data which requires a secure transmission is encrypted. This means that the encryption step S130 is more efficient than if it was used to encrypt every data. Indeed, data intended for the open environment 24 would then be encrypted which is useless.

Further, the proposed method can be implemented in a relatively easy way. In particular, as can be inferred from the description of FIGS. 3 and 4, the architecture of the different elements of the device 10 does not need to be dynamically configurable, so as to belong to the secure environment 26 or not. This is also true for the GPIOs.

The method according to FIG. 8 further comprises a step S140 of receiving the encrypted data and the unencrypted public data at the open environment 24. As explained before, for case 1, this implies that the data "2111 00 00 00" is received by the open environment 24. In case 2, the data received is "12345" followed by the information that a click on a tab has been entered by the user.

The method also comprises a step S150 of forwarding the encrypted data from the open environment 24 to the secure environment 26. This implies that the open environment 24 is able to determine between public data and operative data. For instance, if the public data does not contain any number and the operative data does, the determination is easy, all the data including numbers is forwarded to the secure environment.

In case 1, the data "2111" is sent to the secure environment 26 and in case 2, the data "2345" is sent to the secure environment 26.

According to another embodiment, the method may comprise an additional step of processing the data at the secure environment 26. This step may comprise the decrypting of the encrypted data. Following our basic example, the decryption process consists of subtracting 1 from every digit. Thus, for case 1, the data "2111" becomes "1000", when decrypted. For case 2, the data "01234" is obtained.

Furthermore, in case 1, the step of processing may comprise an authentication process. Indeed, the data entered may be compared with the PIN code. In case 1, the data entered and the PIN code are the same, which results in indicating that the user of the device is the correct user.

In case 2, the step of processing may comprise a standard encryption process, so that the private data can be transmitted via a non-secured network, such as the Internet.

Figure 9:
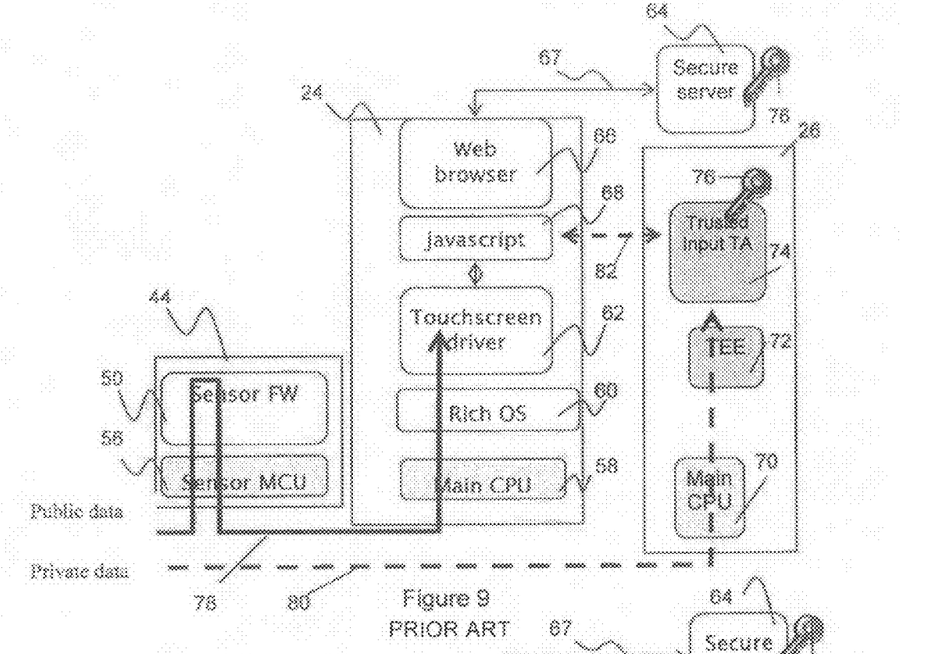
FIGS. 9 and 10 are two schemes of a device according to the prior art.
Figure 10:
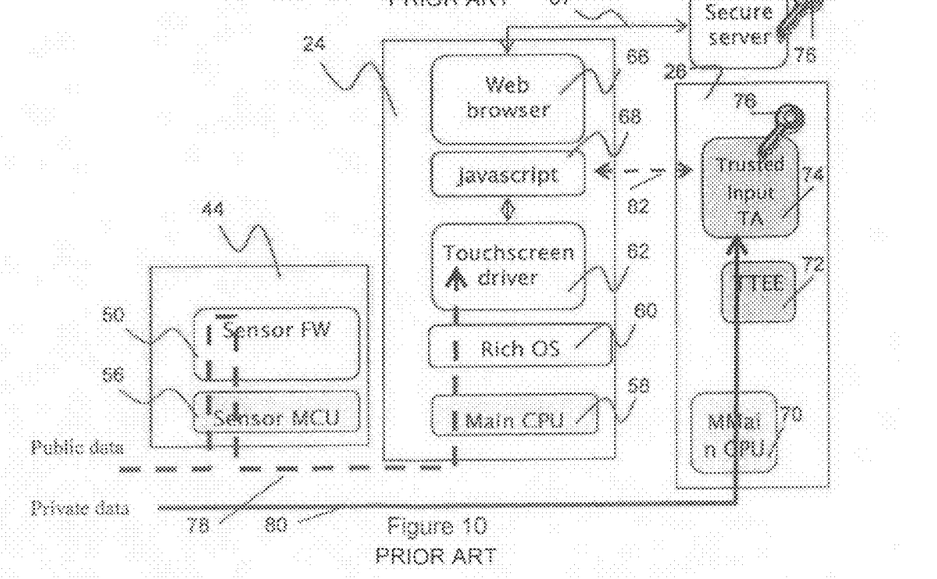
Figure 11:
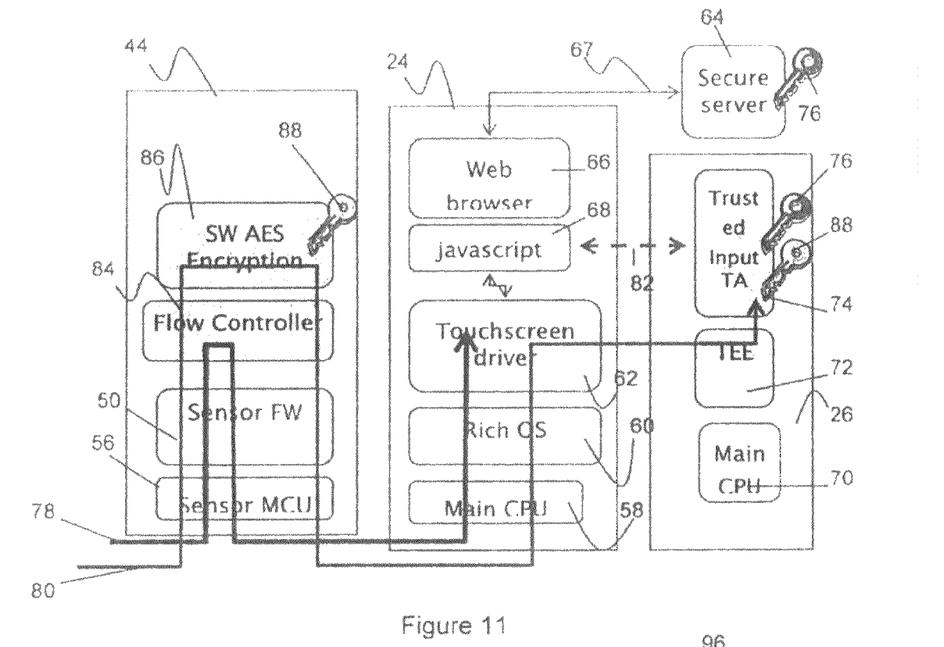
FIGS. 11 and 12, 14 and 15 are schemes of a device according to illustrative embodiments.

The advantages provided by the method according to FIG. 8 for case 2 can further be illustrated by the schematic diagram of FIG. 11, when compared to the schematic diagram of FIGS. 9 and 10 which illustrates the same prior art at different moments of use. FIG. 9 illustrates the interactions between the controller 44, the open environment 24 and the secure environment 26 in the device 10. FIG. 9 is an example wherein the data-input peripheral 12 is a touch sensitive screen. The controller 44 of FIG. 9 comprises a sensor firmware 50 (labelled "sensor FW" on FIG. 9) running on a sensor of a microcontroller 56 (labelled "sensor MCU" on FIG. 9), as known in the art. The open environment 24 comprises a main central processing unit (CPU) 58, a rich operating system 60 and a touch sensitive screen driver 62 for allowing higher-level applications to interact with the touch sensitive screen. The open environment 24 comprises several applications, one enabling to access an external server 64 via the Internet 67. According to FIG. 9, the external server 64 comprises encryption means, e.g. for encrypting communications between the server and a client connected to the server. One could also say that the server 64 is a secure server. The external server 64 interacts with the open environment 24 through the combination of a web browser 66 and Javascripts 68. The functionality required in the web browser could be provided by a trusted plug-in. The trust in the plug-in implies that the browser's operation can be trusted for the purpose at hand. Also, the plug-in can execute in the trusted environment. The plug-in provides connection between javascript 68 and trusted input trusted application ("TA") 74. For instance, the touch sensitive screen driver 62 is able to detect that a specific tab has been activated by the user in the web browser 66, and this detected information can be sent to the server 64. The secure environment 26 comprises a main CPU 70 too, and a trusted execution environment (also named by the acronym "TEE") 72. The TEE 72 is a separate execution environment that runs alongside the rich operating system 60. The TEE 72 provides security services to the rich environment 60 and isolates access to its hardware and software security resources from the rich operating system 60 and its applications. The secure environment 26 also comprises a trusted input trusted application (named "trusted input TA" on FIG. 9) 74. The trusted input TA 74 is able to communicate private data from the secure environment 26 to the server 64 via interactions 82 between JavaScript capabilities of the open environment 24 and the trusted input TA 74.

The flow of public data is transmitted to the open environment 24 via the controller 44. The flow of public data is symbolized by the line 78 on FIG. 8. More precisely, the public data is entered in the data-input peripheral 12, passes then through the sensor microcontroller 56 and the sensor firmware 50 running on the microcontroller 56. Public data are then sent to successively the main CPU 58 of the open environment 24, the rich operating system 60 and the touch sensitive screen driver 62. During this, the public data may be processed and/or modified. For instance, the user is pressing a specific area of the screen so as to activate a display upon choosing the corresponding tab 32, 34, 36, 38 or 40. On the side of the touch sensitive screen driver 62, this data is transformed in activating the application linked to the tab 32, 34, 36, 38 or 40 selected by the user.

The flow of private data is transmitted to the secure environment 26 without passing through the controller 44. The flow of private data is symbolized by the line 80 on FIG. 9. More precisely, the private data is entered in the data-input peripheral 12 and then passes through the main CPU 70 of the secure environment 26, the TEE 72 and the trusted input TA 74. During this transit, the private data may be processed and/or modified. For instance, the user enters a PIN code and the PIN code is authenticated by the trusted input TA 74, which sends information about the comparison between the PIN code entered and the PIN code stored in the secure environment 26.

In the example according to FIGS. 9 and 10, the management of the data is sequential. This is illustrated by the fact that the line 78 illustrating the flow of public data is continuous on FIG. 9 whereas the line 80 illustrating the flow of private data is broken on FIG. 9. In contrast, the line 80 illustrating the flow of private data is continuous on FIG. 10 whereas the line 78 illustrating the flow of public data is broken on FIG. 10. The continuous line corresponds to the fact that the flow of data is indeed transmitted while the broken line corresponds to the fact that the flow of data is not transmitted. In more detail, this means that, on FIG. 9, only the public data is transmitted to the open environment 24 whereas, on FIG. 10, only the private data is transmitted to the secure environment 26. In other words, in the example according to prior art, either the public data is transmitted or the private data is transmitted, but both kinds of data are not continuously or simultaneously transmitted.

For the user who wants to interact with an Internet bank webpage, this results in the situation of use shown in FIG. 5. When the user starts to enter private data, the standard user interface freezes. This means that the user cannot interact with this standard user interface, wherein the public data is entered. This is schematically represented by the hatching lines 33 (shaded area) in the windows. For instance, grey color is alpha blended for the open environment 24, which is a Windows® OS. Indeed, only a portion of the screen is managed by the secure environment 26, both as input and output. This results in the fact that only a basic user experience is supported when the user tries to enter private data. The corresponding situation is for the device 10 of FIG. 10. Therefore, the result of the user interaction is encrypted and then sent to the secure server 64 for processing. Only, one secret key 76 is managed by the secure bank server 64.

In order to facilitate comparison, the same reference numbers as in FIGS. 9 and 10 are kept in FIG. 11 where relevant. The controller 44 of FIG. 11 further comprises a flow controller 84 and an AES encryption software 86. This software 86 enables to encrypt data based on a trusted input key 88 provided by the Trusted Input TA 74.

The flow of public data and private data differs from FIG. 11 compared to the flows represented on FIGS. 9 and 10. This is the sign that a different method for managing public and private data is carried out in the device 10 according to FIG. 11.

Indeed, in FIG. 11, the flow of public data is entered via a data-input peripheral 12 and then passes through the sensor microcontroller 56 and the sensor firmware 50. The data is then sent to the flow controller 84. The public data is then sent to the main CPU 58 of the open environment 24, before passing though the rich operating system 60 and at last being sent to the touch sensitive screen driver 62.

The flow of private data is entered in the data-input peripheral 12 and then passes through the sensor microcontroller 56 and the sensor firmware 50. The data is then sent to the flow controller 84 and then to the AES encryption software 86. In this software, the private data is encrypted using the AES technique. The encrypted data is then sent to the main CPU 58 of the open environment 24, before passing though the rich operating system 60 and at last is sent to the touch sensitive screen driver 62. After this, the private encrypted data is sent to the TEE 72 and then to the trusted input TA 74. The private encrypted data is decrypted in the trusted input TA 74 which has the key 88, provided previously to the software 86 for achieving the AES technique.

The lines 80 and 78 which represent the flow of private and public data are both continuous lines, which indicates that the corresponding flow of data is indeed transmitted. In other words, this means that the method according to FIG. 11 is not sequential as in the prior art illustrated by FIGS. 9 and 10.

Figure 6:
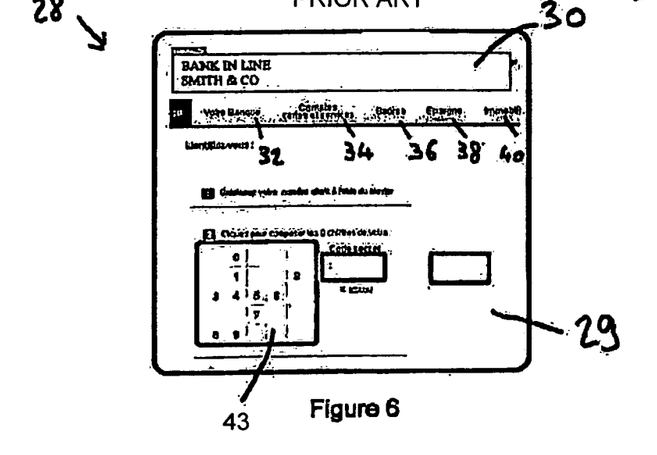

For the user wanting to interact with an Internet bank webpage as in case 2, this results in the situation of the use case of FIG. 6. When user starts to enter private data, the standard user interface of the bank interface 28 is not frozen. This means that the user can interact with this standard user interface, wherein public data is entered. The HTML page is rendered by the standard web browser 66 of the open environment 24. When touching the area 43 dedicated for the private data, the web browser javascript 68 receives encrypted data representative of the fact that data has been entered in an area 43 dedicated for the private data. The browser calls secure environment 26 to process this input event. The secure environment 26 decrypts the encrypted data. The data entered by the user is then deduced and encrypted by the Trusted input TA 74 with a key 76 provided by the secure server 76. It should be understood that the key 76 provided by the secure server 76 is different from the key 88 provided by the Trusted input TA 74 to the encryption software 86. The key 88 is shared only by the secure environment 26 and the controller 44. In other words, in this embodiment, there are two secret keys: one secret key is managed by TEE 72 and the other secret key is managed by the secure bank server 76. The data encrypted by the secret key 76 from the secure bank server 64 is sent in HTML form to secure server 64 for further processing. During all this operation, all the public area is accessible for the user. This results in an improved user experience being supported by the device 10 when the user tries to enter private data.

Furthermore, the comparison between FIG. 10 and FIGS. 8 and 9 shows that the method can easily be implemented in a standard device. Only a reprogramming of the controller is required.

This results in the fact that, in reference to case 2, it is preferable to carry out the method for managing private and public data according to FIG. 11.

Figure 12:
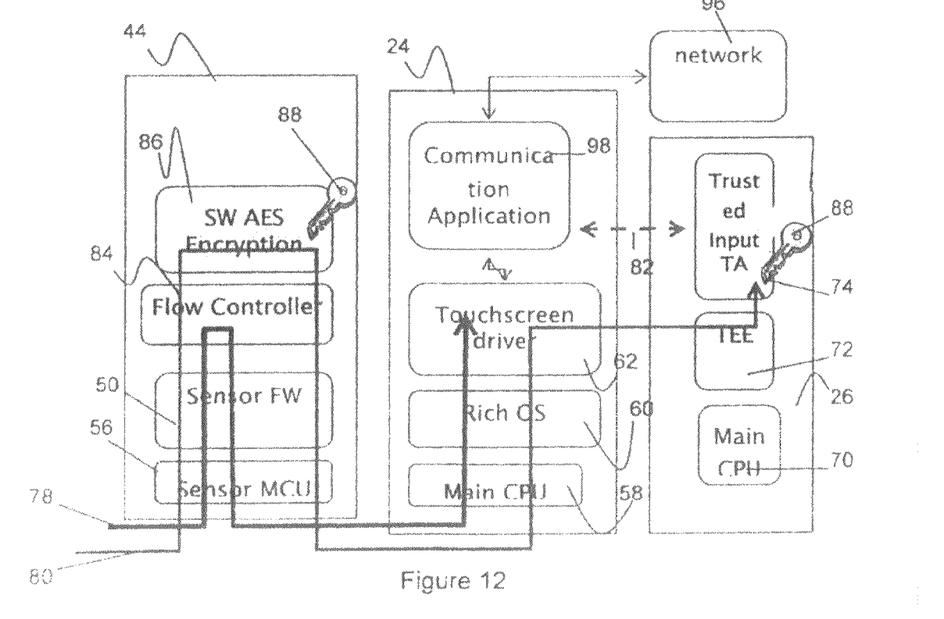

FIG. 12 is the equivalent of FIG. 11 but for case 1. Accordingly, the secure server 64 is replaced by a network 96. The network 96 interacts with the communication application 98 contained in the open environment 24. The communication application 98 replaces the web browser 66 and javascript 66 of FIG. 11. As explained before, in this case, the private data is the PIN code "1000" and the public data is the phone number "00 00 00". In this case, there is only one encryption key 86 which is the key 86 shared by the secure environment 26 and the controller 44.

As can be inferred from FIG. 11 previously described, that the embodiment of FIG. 3 is especially suitable for a touch sensitive screen. In this embodiment, the data sent out by the input peripheral 12 is processed in a subsystem 46 that embeds a sensor processor 45 (microcontroller unit running trusted software which is authenticated by the secure environment 26). The processor 45 gets plain data from the hardware input peripheral 12 captured by the element 16 and performs several steps of processing/conversion of the data received, in order to produce data that can be exploited by the open environment driver 27 which is enclosed in the open environment 24. The secure environment 26 communicates through a secure channel with the software 54 to turn on and off the encryption of the processed data before they are sent to the open environment 24. In specific embodiments, the secure environment 26 may tell the sensor processor 45 which input area in the touch screen is to be protected. The menu selection can thus remain unencrypted.

The embodiment of FIG. 3 is especially suitable for a touch sensitive screen in so far this embodiment requires some intelligence to extract exploitable data from signals coming from the touch sensitive screen. The sensor processor 45 of the software is trusted in the sense that it is authenticated and thus legitimate. There is no specific need for it to be confidential, so its source code can be fully open.

In contrast, in the embodiment according to FIG. 4, the peripheral 12 is a keypad or keyboard. The driver in the open environment 24 forwards the encrypted data to the secure environment 26, which implements its own peripheral driver on top of a decryption layer. This embodiment is especially suitable for a hardware keypad, which sends out data that can be directly interpreted. In this embodiment, the hardware component 44 can also provide control to the secure environment 26 to choose which input entries must be encrypted (for instance, only the keypad, but not the function keys). Similarly to the embodiment of FIG. 3, the menu selection could remain unencrypted.

Figure 13:
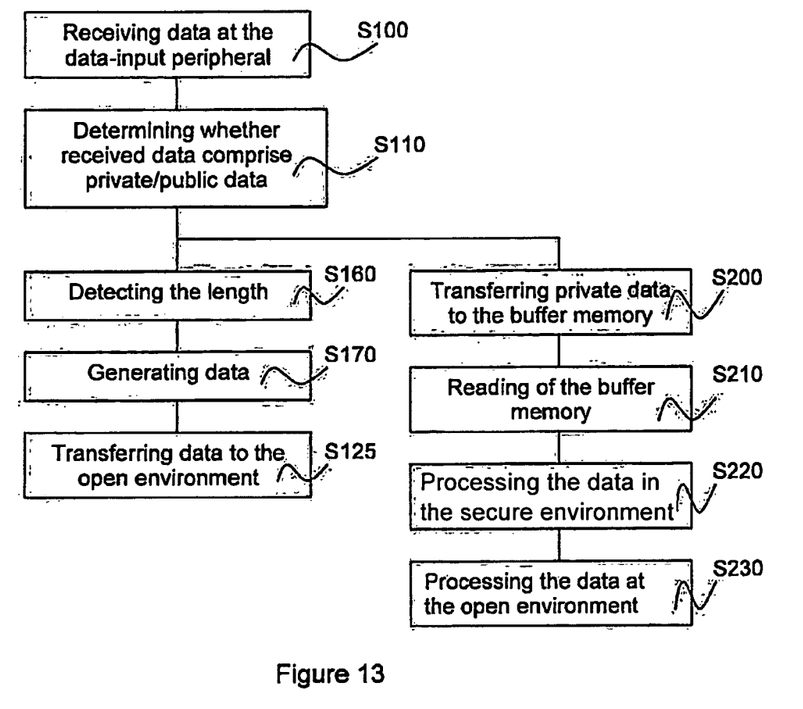
FIG. 13 is a Flowchart of an embodiment of the proposed method.
Figure 14:
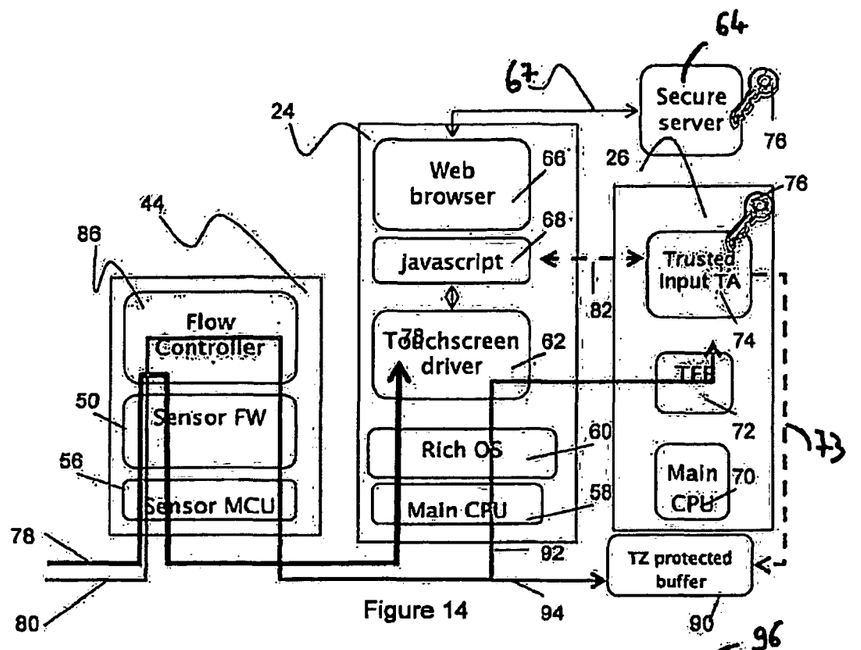

According to another embodiment, the method for managing public and private data input at a device may be the one of the flowchart of FIG. 13 and the example of use for case 2 shown in the schematic view of FIG. 14. In this case, the device 10 comprises a buffer memory 90 (labelled as TZ protected buffer for Trustzone protected buffer on FIG. 14) only accessible by the secure environment 26 and the controller 44. Thus, the buffer memory 90 should be construed as a secure memory, the open environment 24 having no access to this memory 90.

The method according to the flowchart of FIG. 13 comprises the step S100 of receiving data at the date-input peripheral 21 and the step S110 of determining as described in reference to the method of flowchart of FIG. 8. The method according to the flowchart of FIG. 13 further comprises the step S125 of transferring data from the controller to the open environment. In the example of the flowchart of FIG. 13, the method further comprises a step S200 of transferring the private data from the controller to the buffer memory 90.

In addition to the advantages previously mentioned, in this embodiment, the private data and public data are managed without using encryption which may be easier to implement.

In the specific embodiment of FIG. 13, the method further comprises a step S160 of detecting the length of the private data by the controller 44. The method also encompasses a step S170 of generating data having the same length as the private data at the controller 44. The data generated is dummy data. Dummy data is a character or other piece of information entered in a computer only to meet prescribed conditions (here the length). For instance, if a code "0123456789" is the bank code of a user, the dummy data may be "0xDEADBEEF". In this example, the data "0xDEADBEEF" generated is thus representative of the existence of the private data "0123456789". At the step S120 of transferring data from the controller 44 to the open environment 24, the public data and the dummy data as "0xDEADBEEF" are transferred to the open environment 24.

As an illustration, the step S200 of transferring is carried out simultaneously to the steps S160 of detecting, the step S170 of generating and the step S125 of transferring data from the controller to the open environment, but it can be carried out at another moment.

According to the flowchart of FIG. 13, the method also comprises a step S210 of reading the content of the buffer memory 90. The reading step is achieved in the secure environment 26. The data is also processed in the secure environment 26 at step S220 of processing the read data. For instance, processing the data may comprise comparing read data with other data already stored in the secure environment 26. The method also comprises another step S230 of processing at the open environment 24 the data transferred from the controller 44 to the open environment 24 according to the processed data obtained in the secure environment 26. As an example, for case 1, the device will dial the phone number only in case the PIN code entered is the right PIN code.

The advantages provided by the method according to FIG. 13 can also be illustrated by the schematic diagram of FIG. 14, when compared to the schematic diagram of FIGS. 8 and 9.

The same reference numbers as in FIGS. 9, 10 and 11 are kept in FIG. 14 where relevant. The controller of FIG. 14 further comprises a flow controller 86.

The flow of public data and private data differs in FIG. 14 when compared to the flows represented on FIGS. 9 and 10. This is a sign that a different method for managing public and private data is carried out in the device according to FIG. 14.

Indeed, in FIG. 14, the flow of public data is entered in the data-input peripheral 12 and then passes through the sensor microcontroller 56 and the sensor firmware 50 running on the sensor microcontroller 56. The data is then sent to the flow controller 86. The public data is then sent to the main CPU 58 of the open environment 24, before passing though the rich operating system 60 and at last being sent to the touch sensitive screen driver 62.

The flow of private data is entered in the data-input peripheral 12 and then passes through the sensor microcontroller 56 and the sensor firmware 50 running on the sensor microcontroller 56. The private data is then sent to the flow controller 86. Here the flow controller 86 detects the length of the private data and generates dummy data. The dummy data is sent then sent to the main CPU 70 of the open environment 24, before passing though the rich operating system 60 and at last being sent to the touch sensitive screen driver 62. The open environment 24 then requires the trusted input TA 74 to determine what it should do with the dummy data. The dummy data is an indication for the open environment 24 that input is expected from the secure environment 26.

The private data is sent to a trustzone protected buffer (named as TZ protected buffer) 90 to which the trusted input TA 74 can access. This access is symbolized by the broken line 73. The trusted input TA 74 accesses the TZ protected buffer 90 upon request of the open environment 24.

The lines 78 and 80 which represent the flow of private and public data are thus both continuous, which indicates that the corresponding flow of data is indeed transmitted. In other words, this means that the method according to FIG. 14 is not sequential as in the prior art illustrated by FIGS. 9 and 10. The same advantages deduced from the comparison made previously between FIG. 11 and FIGS. 9 and 10 are also provided by this embodiment to the user of the device 10.

Furthermore, compared to the embodiment of FIG. 11, the embodiment of FIG. 14 enables that actual touch sensitive screen information is stored in a TZ protected buffer, without the need of internal encryption.

Figure 15:
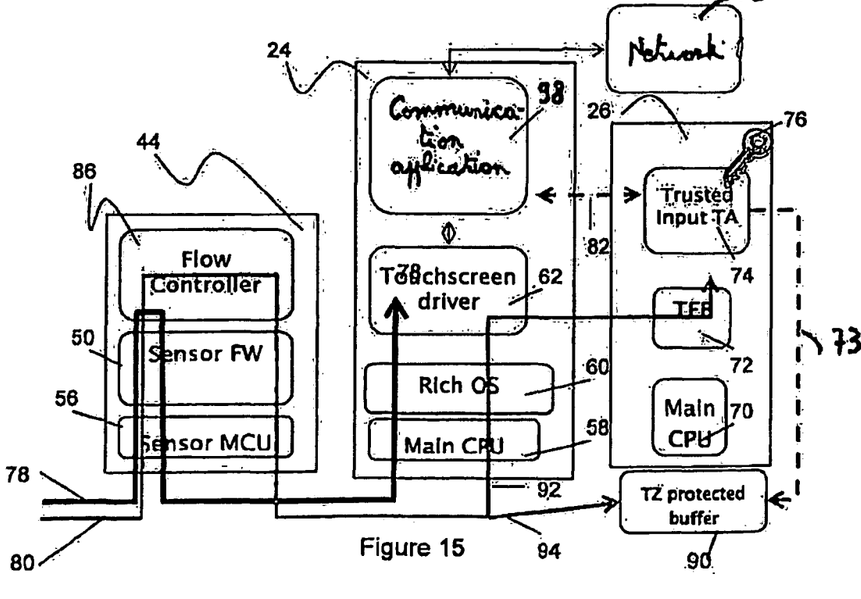

FIG. 15 is the equivalent of FIG. 14 but for case 1. Accordingly, the secure server 64 is replaced by a network 96, this network 96 interacts with the communication application 98 contained in the open environment 24. The communication application 98 replaces the web browser 66 and javascript 66 of FIG. 14. As explained before, in this case, the private data is the PIN code "1000" and the public data is the phone number "00 00 00". In this case, there is only one encryption key 86 which is the key 86 shared by the secure environment 26 and the controller 44.

In every embodiment, the method may be performed based on a computer program comprising instructions for performing the method. The program is executable on a programmable device. The application program may be implemented on a high-level procedural or object-oriented programming language, or in assembly or machine language if desired. In any case, the language may be compiled or interpreted language. The program may be a full installation program, or an update program. In the latter case, the program is an update program that updates a programmable device, previously programmed performing parts of the method, to a state wherein the device is suitable for performing the whole method.

The program may be recorded on a data storage medium. The data storage medium may be any memory adapted for recording computer instructions. The data storage medium may thus be any form of nonvolatile memory, including by way of example semiconductor memory devices, such as EPROM, EEPROM, and flash memory devices; magnetic disks such as internal hard disks and removable disks; magneto-optical disks; and CD-ROM disks.

The invention has been described with reference to preferred embodiments. However, many variations are possible within the scope of the invention.

The invention claimed is:

1. A method for managing public and private data input on a device comprising interconnected electronic components comprising:
   a data-peripheral configured to accept data input by a user;
   an open environment comprising the device's operating system;
   a secure environment configured to not be accessible by a user of the device in order to download applications thereto or run applications therefrom and to not be accessible by the open environment of the device; and
   a controller connected to the data-input peripheral, to the open environment, and to the secure environment;
   wherein the method comprises:
   receiving, by the controller, data accepted at the data-input peripheral, the accepted data being data input by a user of the device;
   determining, by the controller, based on instructions provided by the secure environment whether the received data comprises private data; and
   when the received data comprises private data, then providing by the controller to the secure environment a secured access to the private data, the controller causing the secure environment to access the received private data by:
   detecting a length of the private data;
   generating operative data having a same length as the length of the private data; and
   sending the operative data to the secure environment via the open environment;
   wherein the operative data comprises data associated with the private data that indicates that the received data comprises private data and the private data; and
   wherein the operative data is data that is shared only between the interconnected electronic components of the device.

2. The method according to claim 1, wherein the method further comprises:
   determining by the controller whether the received data comprises public data, and when the received data comprises public data, causing the controller to transfer the public data to the open environment.

3. The method according to claim 1, wherein the controller comprises encryption capability and wherein the method further comprises encrypting by the controller the private data into encrypted data wherein the operative data comprises the encrypted data.

4. The method according to claim 3, wherein the method further comprises:
receiving, from the controller, the operative data and the public data by the open environment; and forwarding the operative data from the open environment to the secure environment.

5. The method according to claim 3, wherein the encryption capability is provided by an encryption module in the controller.

6. The method according to claim 3, wherein encrypting is performed in accordance with an Advanced Encryption Standard (AES) technique.

7. The method according to claim 2, wherein the device further comprises a buffer that is only accessible by the controller and the secure environment, and where in the method further comprises transferring the private data from the controller to the buffer memory.

8. The method according to claim 7, wherein the method further comprises:
reading by the secure environment the private data from the buffer memory;
processing by the secure environment the private data read by the secure environment from the buffer memory;
processing by the open environment the operative data transferred from the controller to the open environment in accordance with the processed private data obtained by the secure environment.

9. The method according to claim 8, wherein processing by the open environment consists of replacing the operative data with the processed private data obtained by the secure environment.

10. The method according to claim 1, wherein the device is chosen from a group consisting of a mobile handset, a personal digital assistant, a personal computer, and an electronic tablet device.

* * * * *